Patented Feb. 20, 1923.

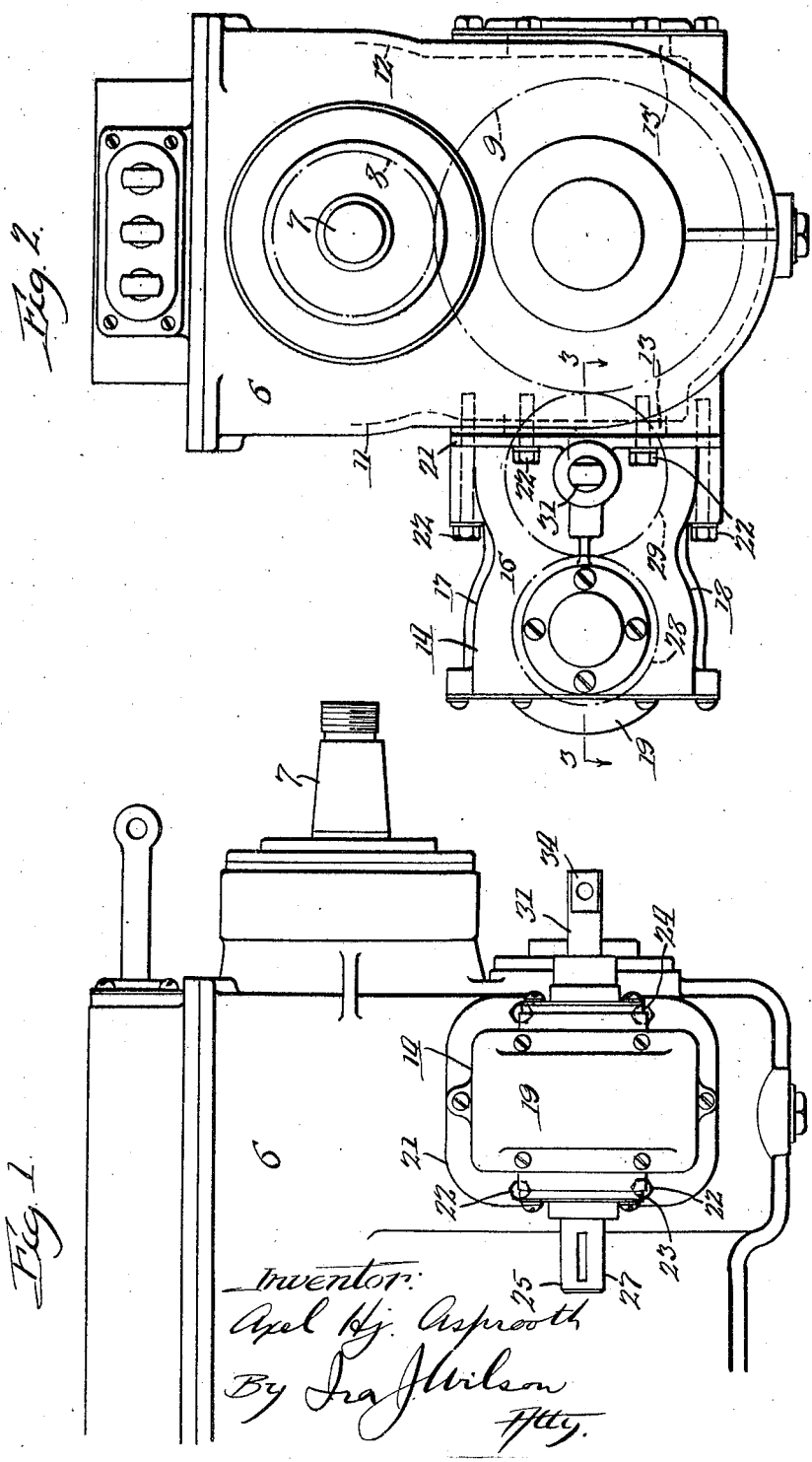

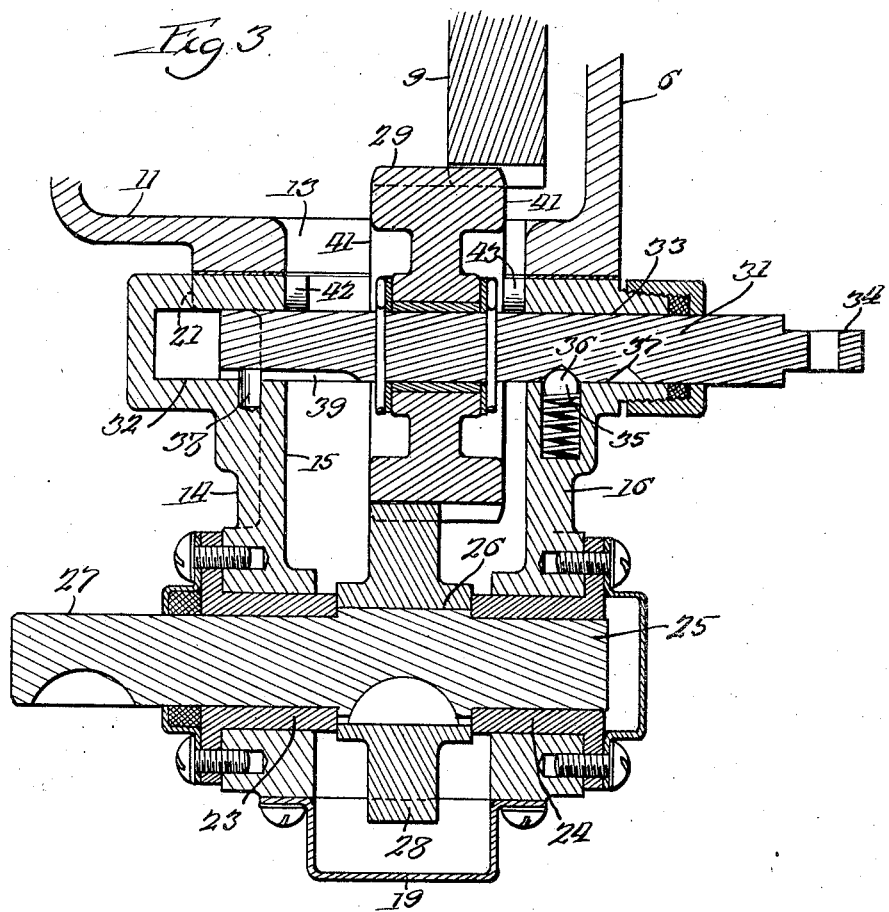

1,446,326

UNITED STATES PATENT OFFICE.

AXEL HJ. ASPROOTH, OF ROCKFORD, ILLINOIS, ASSIGNOR TO COTTA TRANSMISSION COMPANY, OF ROCKFORD, ILLINOIS, A CORPORATION OF ILLINOIS.

POWER TAKE-OFF FOR CHANGE-SPEED TRANSMISSIONS.

Application filed August 4, 1919. Serial No. 315,100.

*To all whom it may concern:*

Be it known that I, AXEL HJ. ASPROOTH, a citizen of the United States, residing at Rockford, in the county of Winnebago and State of Illinois, have invented certain new and useful Improvements in Power Take-Offs for Change-Speed Transmissions, of which the following is a specification.

This invention pertaining in general to change speed gear transmissions has more particular reference to the provision of means for delivering power from the transmission through sources other than the driven shaft thereof.

In that class of transmissions particularly adapted for motor trucks and tractors, it is desired to utilize the power for other purposes than simply propelling the vehicle. That is, in some instances it is desired to utilize the power from the transmission to operate a lifting mechanism or crane on the truck or for operating a pump or a generator, or for numerous other purposes. It follows that inasmuch as the conditions and requirements for these various uses of power are different in most cases, the point of power take-off must be accordingly suited to the particular requirements at hand.

The primary object of the present invention is to provide a power take-off of such novel design as to meet the varying conditions and requirements of the trade. In other words, I have provided a power take-off unit adapted to be mounted in any of a plurality of positions in co-operative relation with a transmission mechanism for the purpose of delivering power at any of a plurality of points considered adequate for the various requirements mentioned. For example, my invention contemplates as an object the provision of a power take-off unit in the form of an auxiliary casing carrying a power take-off shaft and driving means therefor, together with means for breaking the driving train when desired, and the mounting of this self-contained power take-off unit in any of a plurality of positions on the transmission casing, with the driving means in driving relation with the transmission gearing. It also contemplates inversion of the power take-off unit in either of said positions to change the point of power take-off, or if conditions require, remounting of the power take-off shaft on the auxiliary casing so as to change the point of power take-off with respect to the position of the shifting means which connects and disconnects the power take-off shaft and the transmission gearing. It will be understood, of course, that the foregoing is simply a general statement of certain uses of my improvements, and that the latter is capable of broad application.

Another object is to provide a power take-off unit of the general character described which shall be of such simple and novel construction as to be capable of economical production and which shall serve practically and efficiently the purposes desired.

Other objects and attendant advantages will be appreciated as the invention becomes better understood by reference to the following description when considered in connection with the accompanying drawings, in which—

Figure 1, is a side elevation of the front end of a change speed transmission equipped with my improvements;

Figure 2, a front elevation of the transmission showing the power take-off unit attached to the right hand side thereof;

Figure 3, an enlarged plan sectional view taken substantially on the line 3—3 of Figure 2.

My improvements are applicable to practically any change speed transmission such as is used on motor vehicles especially trucks and tractors. In the present case, I have shown for purpose of illustration a gear transmission of the selective type illustrated fully in my Patent No. 1,262,618. It is deemed unnecessary to illustrate any more of the transmission construction than is needed for an understanding of the present invention, consequently, I have simply shown in outline a transmission casing, of conventional design designated generally by the character 6. The driving shaft 7 extends from the front end of the casing and carries a gear 8 in mesh with a gear 9 which in this particular transmission drives the countershaft. It may be concluded therefore, that the gear 9 is a part of the change speed gearing within the transmission casing, and since this particular gear is in constant driving connection with the shaft 7 without transmitting power to the wheels, it serves as a satisfactory agency through which to transmit power to the take-off unit which will now be described. It will be first observed, however, that the left and right hand side wall 11 and 12 of the transmission casing is each formed with an opening 13 and 13' in lateral alignment with the gear 9 so as to permit access to this gear from the exterior of the transmission casing at either side thereof.

Referring to Figure 2, it will be observed that the power take-off unit inclosed and supported by an auxiliary casing designated generally by character 14, is attached to the right hand side of the transmission casing, covering the opening 13 therein. This auxiliary casing in the embodiment shown for purpose of illustration consists of side walls 15 and 16 joined by top and bottom walls 17 and 18 respectively, the casing being open from end to end and provided with a cover cap 19 closing its outer end and with a bolt-receiving flange 21 at its inner end through which flange bolts 22 are passed for rigidly securing the auxiliary casing to the transmission casing. The side walls 15 and 16 of the auxiliary casing are shaped for the reception of bearings 23 and 24 respectively, in which is journaled a power take-off shaft 25. It will be noted that this shaft is of enlarged diameter intermediate the ends of the bearings 23 and 24, so that this enlarged portion 26 presents shoulders engaged by the inner ends of said bearings for holding the shaft in position against longitudinal displacement. The end 27 of the shaft extends beyond the bearing 23 and is adapted to have rigidly attached thereto either a driving gear, sprocket or pulley for transmitting the drive for whatever purpose required. The power delivery shaft 27 is equipped with a fixed gear 28 disposed centrally between the side walls 15 and 16. This gear 28 is permanently in mesh with a shiftable intermediate gear 29 which is freely rotatable upon but mounted to move longitudinally with a shifting shaft or rod 31 journaled in bearings 32 and 33 in the side walls of the auxiliary casing. The end 34 of the shaft 31 is adapted to be manually shifted by the operator through the agency of any suitable connection for shifting the gear 29 into and out of mesh with the gear 9 in the transmission casing. As shown plainly in Figure 3, the face of the gear 29 is substantially twice the width of the gear 28 and it follows that these gears will remain permanently in mesh when the gear 29 is shifted into and out of mesh with the gear 9. A spring pressed ball plunger 35 engageable in the notches 36 and 37 serves to hold the shifting rod in either position, and the pin 38 carried by the wall 15 and located in the key way 39 in the shaft holds it against rotative movement. The shifting movement of the shaft in opposite directions is limited by contact of the sides 41 of gear 29 against the stops 42 and 43 at the inner side of the walls 15 and 16 respectively.

From the foregoing it will be manifest that the casing 14 carries an organization of parts adapted for power take-off purposes and to be secured as a unitary structure to the casing of a change speed transmission in operative relation with the gearing therein. The power take-off casing may be secured to either side of the transmission casing, that is, in a position covering either the opening 13 or 13', so as to deliver the power from either side of the transmission. It will be observed that the bolt openings in the transmission casing for the reception of bolts 22 are arranged similarly at each side of the transmission and are further arranged so that the casing 14 may be attached in a position inverted from that shown. Such inversion would position the power delivery shaft 25 at the front of the transmission and the operating shaft 34 at the rear thereof, viewing Figure 1. In such case, the shiftable gear 29 would be out of engagement with the gear 9 when the spring pressed ball 25 is located in the notch 36. It will thus be seen that the casing 14 may be attached to the transmission casing in any of four positions. Provision has also been made for inverting the position of the power delivery shaft 25 without changing the position of the casing 14. Viewing Figure 3, it will be plainly evident that the bearings 23 and 24 have been so proportioned and the shaft so shaped as to permit removal of the latter and replacement with the driving end 27 extending from the forward end, that is, from the bearing 24 instead of from the rear of the casing as shown. By reason of the novel construction of the power take-off unit, it is possible without any additional cost or the requirement of additional or extra parts, to place the power take-off shaft in any of a plurality of different positions with respect to the transmission proper, and in each of which positions an operative driving connection is maintained with the gearing in the transmission. Thus, a power take-off unit of this character is especially desirable for the various conditions and requirements of the trade.

It is believed that the foregoing conveys a clear understanding of the objects of the invention, and while I have illustrated and described but a single working embodiment thereof, it should be understood that various changes might be made in the construction and arrangement without departing from the spirit and scope of the invention as expressed in the appended claims; in which—

I claim:

1. The combination with a transmission mechanism including a gear, of a power take-off mechanism adapted to be driven by said gear, comprising an elongated gear axially shiftable into and out of mesh with said transmission gear, a power take-off shaft, and a gear fixed to said shaft and permanently in mesh with said shiftable gear in any shifted position thereof.

2. The combination with a gear transmission mechanism, the casing of which has an opening in each side wall in lateral alignment with the inclosed gearing, of a self-contained power take-off unit comprising an auxiliary casing equipped with a power take-off shaft, a gear for driving said shaft and means for connecting said gear with and disconnecting it from said shaft, and means for connecting said unit to either side of the transmission casing covering the opening therein and with the power take-off gear in operative relation to the transmission gearing.

3. The combination with a transmission casing inclosing change speed gearing and shaped to provide an opening through each side of the casing in lateral alignment with one of the gears therein, a power take-off gear casing, gearing therein comprising a shiftable driving gear and a driven gear permanently in mesh therewith, and means for securing said gear casing to either side of the transmission with said driving gear extending through the respective opening in said transmission casing and in mesh with said gear therein.

4. The combination of a transmission casing inclosing change speed gearing and having an opening in one side in lateral alignment with one of the gears, and a power take-off unit comprising an auxiliary casing detachably secured to the transmission casing over the opening therein, a shiftable gear mounted within said auxiliary casing and adapted to mesh with said gear in the transmission casing, and a power delivery shaft mounted on said auxiliary casing and equipped with a gear permanently in mesh with said shiftable gear.

5. The combination of a transmission casing inclosing change speed gearing and having an opening in each side in lateral alignment with one of the gears therein, an auxiliary casing adapted to be secured to the transmission casing on either side thereof, covering either of said openings therein, a shiftable gear carried by said auxiliary casing, a power take-off shaft carried by said auxiliary casing and equipped therein with a gear permanently in mesh with the shiftable gear, said shiftable gear being adapted to be shifted into and out of mesh with said gear in the transmission casing in either position of the auxiliary casing thereon.

6. The combination of a transmission casing inclosing change speed gearing, an auxiliary casing attached to the transmission casing and carrying a longitudinally shiftable shaft and a power take-off shaft, a gear mounted on the shiftable shaft and adapted to be moved into and out of mesh with a gear in the transmission casing by shifting said shaft longitudinally, and a gear fixed to the power take-off shaft and permanently in mesh with said shiftable gear.

7. The combination of a transmission casing inclosing change speed gearing, an auxiliary casing attached to the transmission casing and carrying a longitudinally shiftable shaft and a power take-off shaft, a gear mounted on the shiftable shaft and adapted to be moved into and out of mesh with a gear in the transmission casing by shifting said shaft longitudinally, a gear fixed to the power take-off shaft and permanently in mesh with said shiftable gear, said shiftable shaft having an operable end extending beyond the exterior of the front wall of the auxiliary casing, and said auxiliary casing being so attached to the transmission casing that it may be inverted as a unit with respect to said casing and reattached thereto so that said operable end of the shiftable shaft is disposed at the rear of the auxiliary casing.

8. The combination of a transmission casing inclosing change speed gearing and having an opening in each side in lateral alignment with one of the gears therein, and a power take-off unit comprising an auxiliary casing adapted to be secured to the transmission casing at either side thereof covering the opening in such side, a power delivery shaft carried by said auxiliary casing, and gearing carried by said casing and arranged so as to be in cooperative relation with said gear in the transmission casing when the auxiliary casing is attached to either side of the transmission casing.

9. The combination of a transmission casing inclosing change speed gearing, and a power take-off unit comprising an auxiliary casing carrying a power take-off shaft and permanently meshing gears one of which is adapted to be shifted into and out of mesh with one of the gears in the transmission casing, and means for connecting said auxiliary casing to the transmission casing in any of a plurality of positions in which the power take-off gearing is in co-operative relation to the change speed gearing.

10. The combination of a transmission casing inclosing change speed gearing and having an opening in each side in lateral alignment with one of the gears therein, and a power take-off unit comprising an auxiliary casing equipped with a power take-off shaft and with means adapted to be driven from said gear in the transmission casing for driving said power take-off shaft, and means for attaching the auxiliary casing to the transmission casing at either side thereof covering the opening therein and with said driving means in cooperative relation with said transmission gear.

11. The combination with a gear transmission mechanism, of a power take-off mechanism, comprising a casing, a power take-off shaft mounted in bearings at both ends in said casing, and having a power delivery end projected beyond the casing, a gear fixed to said shaft between said bearings, a gear within the casing meshing with the first mentioned gear and adapted to be shifted into and out of mesh with a transmission gear, and means whereby said shaft may be reversed in the casing without disturbing the relation of said gears.

12. The combination with a gear transmission mechanism, of a power take-off shaft, a gear fixed thereon, a gear permanently in mesh with the first mentioned gear and adapted to mesh with a gear of said transmission mechanism, means for shifting the second mentioned gear into and out of mesh with said transmission gear, an auxiliary casing carrying said first and second mentioned gears and said shaft and constituting therewith a power take-off unit, and means for connecting said unit to the transmission casing in any of a plurality of different positions.

AXEL HJ. ASPROOTH.